United States Patent [19]
Koenig

[11] Patent Number: 6,057,782
[45] Date of Patent: May 2, 2000

[54] METHOD AND APPARATUS FOR PAGING ALTERNATE USERS

[75] Inventor: Andrew R. Koenig, Gillette, N.J.

[73] Assignee: AT&T Corporation, New York, N.Y.

[21] Appl. No.: 08/903,089

[22] Filed: Jul. 30, 1997

[51] Int. Cl.[7] ...................................................... G08B 5/22

[52] U.S. Cl. ............................... 340/825.44; 340/825.47; 455/38.1

[58] Field of Search ........................ 340/825.44, 825.47, 340/825.48, 825.54; 455/38.1, 38.4, 458, 31.3, 461, 462, 463, 464, 403; 370/310, 312, 313; 379/211

[56] References Cited

U.S. PATENT DOCUMENTS

| | | | |
|---|---|---|---|
| 4,814,763 | 3/1989 | Nelson et al. | 340/825.44 |
| 5,555,446 | 9/1996 | Jasinski | 340/825.44 |
| 5,596,318 | 1/1997 | Mitchell | 340/825.44 |

*Primary Examiner*—Howard L. Williams
*Assistant Examiner*—Jean B. Jeanglaude
*Attorney, Agent, or Firm*—Kenyon & Kenyon

[57] ABSTRACT

A method and apparatus for a paging service to automatically respond to a paging acknowledgment. The pager server receives an initial pager request from an originating user. The initial paging request is sent to a target user by the paging server. An acknowledgment to the initial pager request is received at the paging server from the target user. If the acknowledgment is not positive, alternate users are paged until a positive acknowledgment is received.

16 Claims, 2 Drawing Sheets

METHOD AND APPARATUS FOR PAGING ALTERNATE USERS

FIELD OF THE INVENTION

The invention relates to paging systems in general. More particularly, the invention relates to the method and apparatus for paging a set of users until a positive acknowledgment is received from one of the set of users.

BACKGROUND OF THE INVENTION

The demand for wireless communication services is increasing at a phenomenal pace. As personal and professional responsibilities increase, individuals find it more and more necessary to be traveling outside their homes and/or offices. Consequently, the need for cost efficient messaging services is greater than ever. Paging services offer a particularly attractive alternative given their ubiquitous coverage and relatively low cost.

Conventional paging systems, however, are unsatisfactory for a number of reasons. For example, in many instances a page request is sent to a user in order to request some sort of emergency service, such as repairing a computer or automated system, providing medical care, repairing a broken water main, and so forth. The person for whom the page is intended, however, may not receive the page, or may be unable to respond to the paging request if received. An example of the former case would be when a pager is inoperative, due to the pager being outside the paging network, the user turning off the pager, or because the pager's batteries are depleted. An example of the latter case might occur if the paged user is involved in a current emergency, or lacks transportation to the emergency site. In any event, the underlying problem that prompted a person or system to initiate the paging request would remain unresolved because the person originally paged is incapable of responding to the paging request.

At least one conventional paging system attempts to solve this problem by including techniques for contacting alternate users other than the originally paged user. This system, however, monitors the underlying problem and contacts alternate users if the underlying problem is not resolved within a predetermined amount of time. Consequently, a condition exists wherein multiple alternate users might be contacted to resolve the problem that initiated the original paging request, in which case the alternate users might unnecessarily arrive at the problem site. This would greatly inconvenience the unnecessary alternate users, and might also prevent them from responding to other emergency situations.

Therefore, it can be appreciated that there exists a substantial need for a method and apparatus that resolves the above discussed problems.

SUMMARY OF THE INVENTION

A method and apparatus for a paging service to automatically respond to a paging acknowledgment. The pager server receives an initial pager request from an originating user. The initial paging request is sent to a target user by the paging server. An acknowledgment to the initial pager request is received at the paging server from the target user. The paging server determines whether the received acknowledgment is positive. If the received acknowledgment is not positive, the paging server selects an alternate user from a list of alternate users. The paging server initiates an alternate paging request to the selected alternate user. The paging server waits for an acknowledgment from the alternate user. If the acknowledgment from the alternate user is not positive, another alternate user is selected from the list of alternate users and sent an alternate paging request. Alternate users are sent alternate paging requests until a positive acknowledgment is received.

With these and other advantages and features of the invention that will become hereinafter apparent, the nature of the invention may be more clearly understood by reference to the following detailed description of the invention, the appended claims and to the several drawings attached herein.

DETAILED DESCRIPTION

A paging service is a wireless communication service that typically provides one way communications between the paging service provider and the user of a paging device. Although conventional pagers have the capability of providing two-way communications, power and bandwidth limitations permit only short messages to be returned to the paging service provider. Consequently, a user of a paging device is capable of providing only limited instructions back to the service provider in response to a paging request. For example, conventional pagers offer the capability of sending back simple messages such as "Yes" or "No". Other pagers offer a short list of preset responses, such as "meet me at 6:00 P.M." The paged user then selects a number corresponding to the preset response, and the selected number is sent back to the paging service provider.

One embodiment of the invention increases the robustness of this limited two-way messaging by providing a method and apparatus for paging alternate users in response to one of two conditions: (1) an acknowledgment is not received within a predetermined period of time ("delay period"); or (2) a negative acknowledgment is received. Thus, alternate users cease to be paged only when a positive acknowledgment is received by the paging service.

Figure 1:
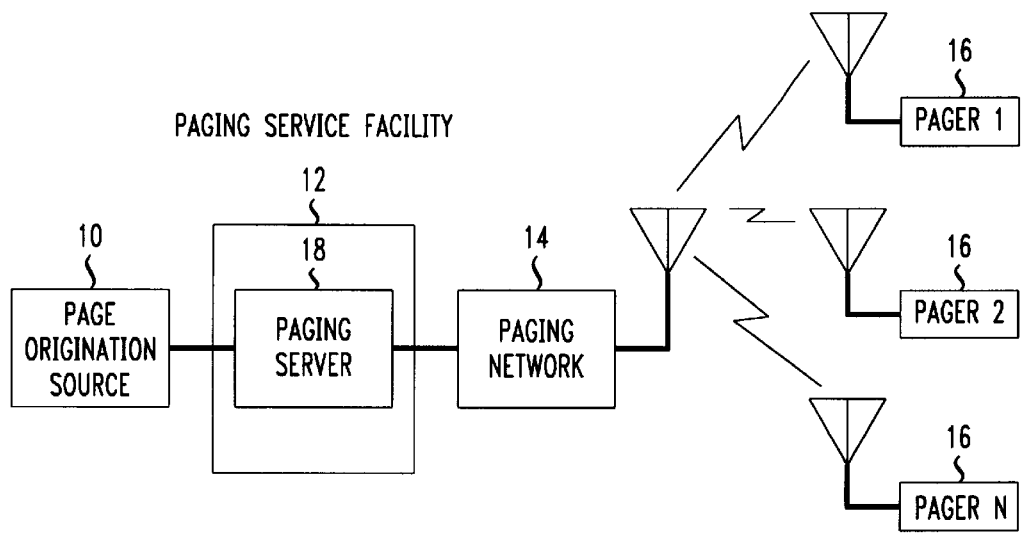
FIG. 1 is a block diagram of a paging system suitable for practicing one embodiment of the present invention.

Referring in detail to the drawings wherein like parts are designated by like reference numerals throughout, there is illustrated in FIG. 1 a paging system that is suitable to practice the present invention. As shown in FIG. 1, a page origination source 10 is connected to a paging service facility 12. Paging service facility 12 includes paging server 18. Paging service facility 12 is connected to a paging network 14. Paging network 14 is connected to pager 1, pager 2, to pager N, which are collectively designated pager 16.

Page origination source 10 can be any user, device or system in need of sending a page request. For example, page origination source may be a user that calls a paging service provider using a telephone handset and the public switch telephone network (PSTN). Another example might be an automated device or system in need of monitoring for problems, such as a telecommunications switch, computer, computer network, and so forth, connecting to the paging service facility over the PSTN, the Internet, a dedicated communications line, or the like.

Once paging service facility 12 receives a paging request from page origination source 10, paging facility service 12 sends a page signal to the initial target user designated by the paging origination source 10 to receive the paging request over paging network 14. Included in paging facility service 12 is paging server 18 for implementing the functionality for one embodiment of the present invention.

Figure 2:
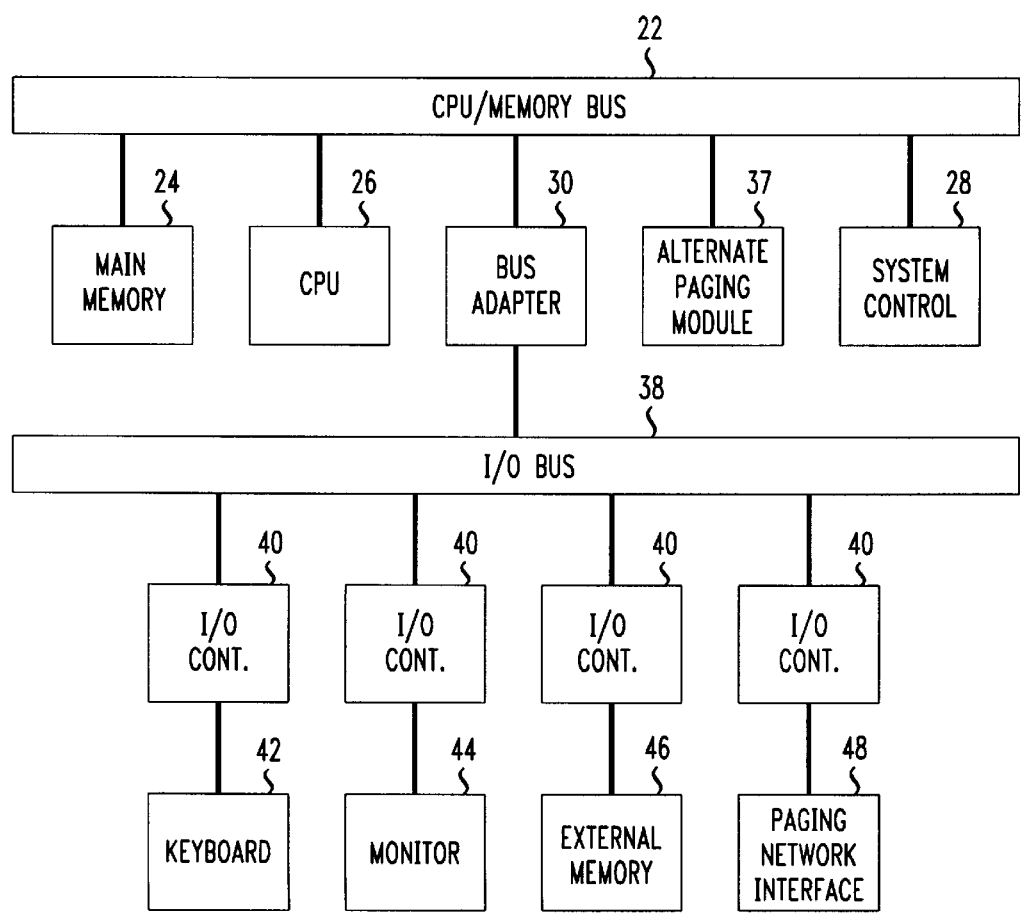
FIG. 2 is a block diagram of a paging server in accordance with one embodiment of the invention.

FIG. 2 is a block diagram of a paging server suitable for practicing one embodiment of the invention. paging server 18 comprises a main memory module 24, a central processing unit (CPU) 26, a system control module 28, a bus adapter 30, and an alternate paging module (APM) 37, each of which is connected to a CPU/memory bus 22 and an Input/Output (I/O) bus 38 via bus adapter 30. Further, paging server 18 contains multiple I/O controllers 40, as well as a keyboard 42, a monitor 44, external memory 46, and a pager network interface 48, each of which is connected to I/O bus 38 via I/O controllers 40.

The overall functioning of paging server 18 is controlled by CPU 26, which operates under the control of executed computer program instructions that are stored in main memory 24 or external memory 46. Both main memory 24 and external memory 46 are machine readable storage devices. The difference between main memory 24 and external memory 46 is that CPU 26 can typically access information stored in main memory 24 faster than information stored in external memory 36. Thus, for example, main memory 24 may be any type of machine readable storage device, such as random access memory (RAM), read only memory (ROM), programmable read only memory (PROM), erasable programmable read only memory (EPROM), electronically erasable programmable read only memory (EEPROM). External memory 46 may be any type of machine readable storage device, such as magnetic storage media (i.e., a magnetic disk), or optical storage media (i.e., a CD-ROM). Further, paging server 18 may contain various combinations of machine readable storage devices through other I/O controllers, which are accessible by CPU 26, and which are capable of storing a combination of computer program instructions and data.

CPU 26 includes any processor of sufficient processing power to perform the alternate user module functionality found in paging server 18. Examples of CPUs suitable to practice the invention includes the INTEL family of processors, such as the Pentium®, Pentium Pro®, and Pentium II® microprocessors.

Network interface 48 is used for communications between paging server 18 and a communications network, such as paging network 14. Network interface 48 supports appropriate functions for sending pages to a pager over paging network 14.

I/O controllers 40 are used to control the flow of information between paging server 18 and a number of devices or networks such as keyboard 42, monitor 44, external memory 46, and paging network interface 48. System control module 28 includes human user system control, user interface, and operation. Bus adapter 30 is used for transferring data back and forth between CPU/memory bus 22 and I/O bus 38.

APM 37 implements the main functionality for this embodiment of the invention. It is noted that APM 37 is shown as separate functional module in FIG. 2. It can be appreciated, however, that the functions performed by this module can be further separated into more modules, combined together with other modules to form a single module, or be distributed throughout the system, and still fall within the scope of the invention. Further, the functionality of this module may be implemented in hardware, software, or a combination of hardware and software, using well-known signal processing techniques. The operation of APM 37 will be described in further detail below with reference to FIG. 3.

Figure 3:
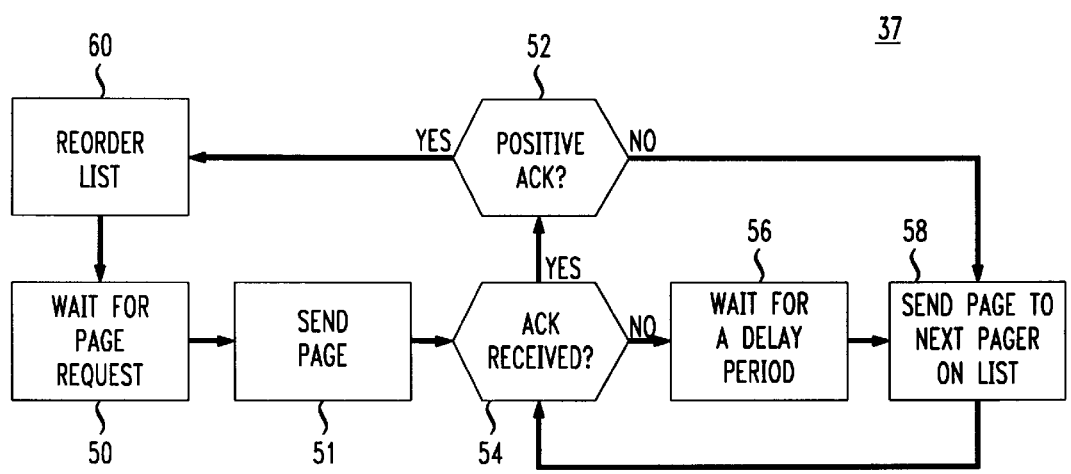
FIG. 3 is a block flow diagram of an alternate paging module in accordance with a first embodiment of the invention.

FIG. 3 is a block flow diagram of an alternate paging module (APM) in accordance with a first embodiment of the invention. As shown in step 50, APM 37 waits for a paging request from page origination source 10. Once a paging request is received, APM 37 initiates an initial page request at step 51 to an initial target user designated by the paging request. APM 37 determines whether an acknowledgment is received from pager 16 of the initial target user at step 54.

If an acknowledgment is received at step 54, APM 37 determines whether the acknowledgment is positive at step 52. A positive acknowledgment is defined as a message from the pager 16 of the initial target user stating that they will respond to the paging request. A negative acknowledgment is a message from pager 16 of the initial target user that they are unwilling or unable to respond to the paging request. This embodiment of the invention assumes pager 16 is capable of providing simple "Yes" or "No" messages to paging service facility 14. A "Yes" response constitutes a positive acknowledgment, whereas a "No" response constitutes a negative acknowledgment.

If a positive acknowledgment is not received at step 52, then an alternate page is sent to an alternate user at step 58. The alternate user is selected from a list of alternate users. The list has a first alternate user and a last alternate user, and if the last alternate user is sent an alternate paging request and a positive acknowledgment has not been received, the next alternate user becomes the first alternative user, i.e., the list wraps around itself. The list of alternate users is ordered by which user should be called in order of priority from first to last, based upon desired parameters. In this embodiment of the invention, the alternate users are initially ordered according to skill level. This ordering may change as discussed in more detail below.

The alternate user can be selected from the alternate user list in at least two ways. First, APM 37 could select the alternate user in top-down order. Second, APM 37 could present a list of alternate users as predetermined menu items to the paged user. The paged user could therefore select the best candidate alternate user to receive an alternate paging request. The first embodiment of the invention employs the first method, while the second embodiment of the invention (described with reference to FIG. 4) employs the second method.

If at step 54 an acknowledgment is not received, then APM 37 waits for a delay period at step 56. The delay period may vary depending upon the particular application of the invention. In this embodiment of the invention, the delay period is set at 10 minutes. After the delay period has expired, an alternate page is sent at step 58.

If at step 52 a positive acknowledgment is received, the list is reordered at step 60. The list can be reordered according to desired parameters for the particular application for which the invention will be implemented. In this embodiment of the invention, the list is reordered to reflect: (1) which alternate users from the list of alternate users responded to the alternate paging requests; and (2) which alternate users positively responded to the alternate paging requests. More particularly, the list is reordered such that alternative users that have sent a negative acknowledgment are placed at the top of the list in random order, alternate users that have sent a positive acknowledgment placed next, and alternate users that failed to provide any response at all are placed last.

The operation of this embodiment of the invention can be better illustrated using an example. A person calls paging service facility 14 using a telephone to request emergency aid for a sick animal. Paging service facility 14 initiates a paging request to a veterinarian over paging network 14. The page is received by the veterinarian's pager 16. The veterinarian, however, is currently involved in an emergency, and is incapable of going to examine the sick animal. The veterinarian then sends a negative acknowledgment to paging service facility 14. Paging server 18 of paging service facility 14 receives the negative acknowledgment, and selects a first alternate user from a predetermined list of veterinarians. Paging server 18 sends an alternate paging request to the first alternate user. The first alternate user, however, has a faulty pager 16 and does not receive the alternate page. Paging server 18 waits for 10 minutes, and since it has not received any acknowledgment at all, it selects a second alternate user from the list. The second alternate user is capable of responding to the request, and therefore sends a positive acknowledgment to paging server 18. APM 37 reorders the list of alternate users with the original paged user first, the second alternate user next, followed by the first alternate user, and finally the untried alternate users next in random order. The positive acknowledgment is logged by paging service facility 14, and the person requesting the page is informed accordingly.

Figure 4:
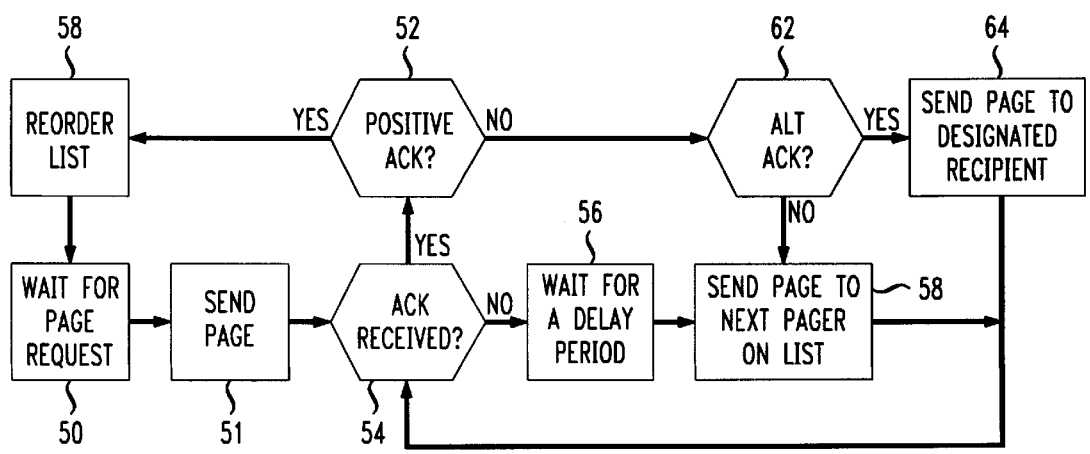
FIG. 4 is a block flow diagram of an alternate paging module in accordance with a second embodiment of the invention.

FIG. 4 is a block flow diagram of an alternate paging module in accordance with a second embodiment of the invention. In this embodiment, steps 50, 51, 52, 54, 56, 58 and 60 are similar to those steps discussed with reference to FIG. 3. In this embodiment of the invention, however, APM 37 presents a list of alternate users as predetermined menu items to the paged user at steps 51 and 58 along with a page. The paged user therefore has the option of selecting the best candidate alternate user to receive an alternate paging request. This might be advantageous, for example, if a person receiving a paging request has knowledge helpful in ensuring that a proper and timely response is made to the underlying emergency prompting the initial page. Thus, if a positive acknowledgment is not received at step 52, the system determines whether the paged user has selected an alternate user at step 62. If an alternate user has been selected at step 62, a page is sent to the selected or designated alternate user at step 64. If an alternate user has not been selected at step 62, APM 37 selects the alternate user and sends an alternate page at step 58.

Although various embodiments are specifically illustrated and described herein, it will be appreciated that modifications and variations of the present invention are covered by the above teachings and within the purview of the appended claims without departing from the spirit and intended scope of the invention. For example, although a delay period of 10 minutes was used in one embodiment of the invention, it can be appreciated that a delay period of any duration falls within the scope of the invention. Further, although the list was reordered according to skill level in one embodiment of the invention, it can be appreciated that the list can be reordered according to any desired parameter and yet fall within the scope of the invention.

What is claimed is:

1. A method for paging alternate users, comprising the steps of:
   receiving an initial paging request at a paging server from an originating user;
   sending said initial paging request to a target user by said paging server;
   receiving an acknowledgment to said initial paging request at said paging server from said target user; and
   determining whether said received acknowledgment is positive, and if not:
   (a) selecting an alternate user from a list of alternate users by said paging server;
   (b) sending an alternate paging request to said selected alternate user;
   (c) receiving an acknowledgment from said selected alternate user; and
   (d) determining whether said acknowledgment is positive, and if not, repeating steps (a) through (d) with a next selected alternate user from said list of alternate users until a positive acknowledgment is received.

2. The method of claim 1, wherein if an acknowledgment is not received from said alternate user at step (c) within a predetermined period of time, steps (a) through (d) are repeated with a next selected alternate user from said list of alternate users until a positive acknowledgment is received.

3. The method of claim 2, wherein said list has a first alternate user and a last alternate user, and if said last alternate user is sent an alternate paging request and a positive acknowledgment has not been received, said next selected alternate user becomes said first alternate user.

4. The method of claim 1, wherein said originating user is a monitoring system for an automated system.

5. The method of claim 1, further comprising the steps of:
   logging said initial paging request at said paging server as successfully delivered; and
   notifying said originating user of said positive acknowledgment.

6. The method of claim 1, wherein said list is arranged in a first order, and further comprising the step of arranging said list in a second order once a positive acknowledgment is received.

7. The method of claim 6, wherein the step of arranging comprises the steps of:
   determining which of said alternate users provided acknowledgments; and
   arranging said list in said second order in accordance with said determination.

8. The method of claim 7, wherein said step of arranging said list in said second order in accordance with said determination comprises the steps of:
   ordering alternate users providing negative acknowledgments first;
   ordering alternate users providing positive acknowledgments second; and
   ordering all other alternate users third.

9. A computer readable medium having stored thereon instructions which, when executed by a processor, cause the processor to perform steps for paging alternate users, said steps comprising:
   receiving an initial paging request at a paging server from an originating user;
   sending said initial paging request to a target user by said paging server;

receiving an acknowledgment to said initial paging request at said paging server from said target user; and determining whether said received acknowledgment is positive, and if not:
   (a) selecting an alternate user from a list of alternate users by said paging server;
   (b) sending an alternate paging request to said selected alternate user;
   (c) receiving an acknowledgment from said selected alternate user; and
   (d) determining whether said acknowledgment is positive, and if not, repeating steps (a) through (d) with a next selected alternate user from said list of alternate users until a positive acknowledgment is received.

10. The computer readable medium of claim 9, wherein said originating user is a monitoring system for an automated system.

11. The computer readable medium of claim 9, wherein if an acknowledgment is not received from said alternate user at step (c) within a predetermined period of time, steps (a) through (d) are repeated with a next selected alternate user from said list of alternate users until a positive acknowledgment is received.

12. The computer readable medium of claim 11, wherein said list has a first alternate user and a last alternate user, and if said last alternate user is sent an alternate paging request and a positive acknowledgment has not been received, said next selected alternate user becomes said first alternate user.

13. The computer readable medium of claim 9, further comprising the steps of:

logging said initial paging request at said paging server as successfully delivered; and notifying said originating user of said positive acknowledgment.

14. The computer-readable medium of claim 13, wherein said list is arranged in a first order, and further comprising the step of arranging said list in a second order once a positive acknowledgment is received.

15. The computer-readable medium of claim 14, wherein the step of arranging comprises the steps of:

determining which of said alternate users provided acknowledgments; and arranging said list in said second order in accordance with said determination.

16. The computer-readable medium of claim 15, wherein said step of arranging said list in said second order in accordance with said determination comprises the steps of:

ordering alternate users providing negative acknowledgments first;

ordering alternate users providing positive acknowledgments second; and ordering all other alternate users third.

* * * * *